(12) United States Patent
Sethi et al.

(10) Patent No.: US 12,259,953 B2
(45) Date of Patent: Mar. 25, 2025

(54) FRAMEWORK FOR PREVENTING SOFTWARE PIRACY IN VIRTUAL MACHINES (VMS) BY USING VIRTUAL HARDWARE ENCRYPTION VERIFICATION

(71) Applicant: EMC IP Holding Company LLC, Hopkinton, MA (US)

(72) Inventors: Parminder Singh Sethi, Punjab (IN); Durai S. Singh, Chennai (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 870 days.

(21) Appl. No.: 16/915,248

(22) Filed: Jun. 29, 2020

(65) Prior Publication Data

US 2021/0406345 A1 Dec. 30, 2021

(51) Int. Cl.
*G06F 21/12* (2013.01)
*G06F 9/455* (2018.01)
*G06F 21/14* (2013.01)
*G06F 21/60* (2013.01)
*H04L 9/08* (2006.01)
*H04L 9/32* (2006.01)
*G06F 21/10* (2013.01)

(52) U.S. Cl.
CPC ........ *G06F 21/123* (2013.01); *G06F 9/45558* (2013.01); *G06F 21/14* (2013.01); *G06F 21/602* (2013.01); *H04L 9/083* (2013.01); *H04L 9/3234* (2013.01); *G06F 2009/45587* (2013.01); *G06F 21/1011* (2023.08)

(58) Field of Classification Search
CPC ...... G06F 21/123; G06F 21/14; G06F 21/602; G06F 9/45558; G06F 2009/45587; G06F 2221/0704

See application file for complete search history.

(56) References Cited

U.S. PATENT DOCUMENTS

| | | | |
|---|---|---|---|
| 5,311,596 A * | 5/1994 | Scott | H04L 9/3271 713/169 |
| 7,024,696 B1 | 4/2006 | Bahar | |
| 7,140,042 B2 | 11/2006 | Verma | |
| 7,565,323 B2 | 7/2009 | Hughes et al. | |
| 9,980,140 B1 * | 5/2018 | Spencer | H04W 12/02 |
| 2006/0064758 A1 | 3/2006 | Petner et al. | |
| 2019/0392117 A1 * | 12/2019 | Viswanathan | G06F 21/606 |

OTHER PUBLICATIONS

Menezes et al., "Handbook of Applied Cryptography", 1997 CRC Press, pp. 397-403.*

* cited by examiner

*Primary Examiner* — Matthew T Henning
(74) *Attorney, Agent, or Firm* — Workman Nydegger

(57) ABSTRACT

One example method includes receiving, from a VM, a request for a software license, in response to the request, transmitting a UUID to the VM, receiving, from the VM, a response that comprises a first encrypted UUID corresponding to the request, and transmitting a client object that includes the first encrypted UUID, and the client object serves as a request for entry of the client object in a database of a cloud computing site.

7 Claims, 5 Drawing Sheets

FRAMEWORK FOR PREVENTING SOFTWARE PIRACY IN VIRTUAL MACHINES (VMS) BY USING VIRTUAL HARDWARE ENCRYPTION VERIFICATION

FIELD OF THE INVENTION

Embodiments of the present invention generally relate to management of software in a virtual environment. More particularly, at least some embodiments of the invention relate to systems, hardware, software, computer-readable media, and methods for preventing software piracy in virtual machines.

BACKGROUND

Software piracy is a problem of great concern that has yet to be adequately addressed. For example, according to the 2018 Business Software Alliance (BSA) Global Software survey, the commercial value of unlicensed software in 2018 was about $46.3B, 2 in 5 copies of software products in distribution had not been paid for, and about 37% of personal computers had unlicensed software installed.

Moreover, software piracy impacts both software vendors and end-users alike. Particularly, software piracy reduces the revenue and profit margin of software vendors, and users of unlicensed software may be exposed to security and malware attacks. An attempt has been made to address such problems by way of software-based encryption. However, although software-based encryption may be secure, it is complex, impacts hardware performance, and is vulnerable to hacking.

In more detail, in the example of a virtualized environment, the IT administrator assigns virtual machines (VMs) for the users. An IT admin or individuals may install different applications on the VMs based on particular user requirements. As such, managing application licenses in a virtual environment is a major challenge for software vendors.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
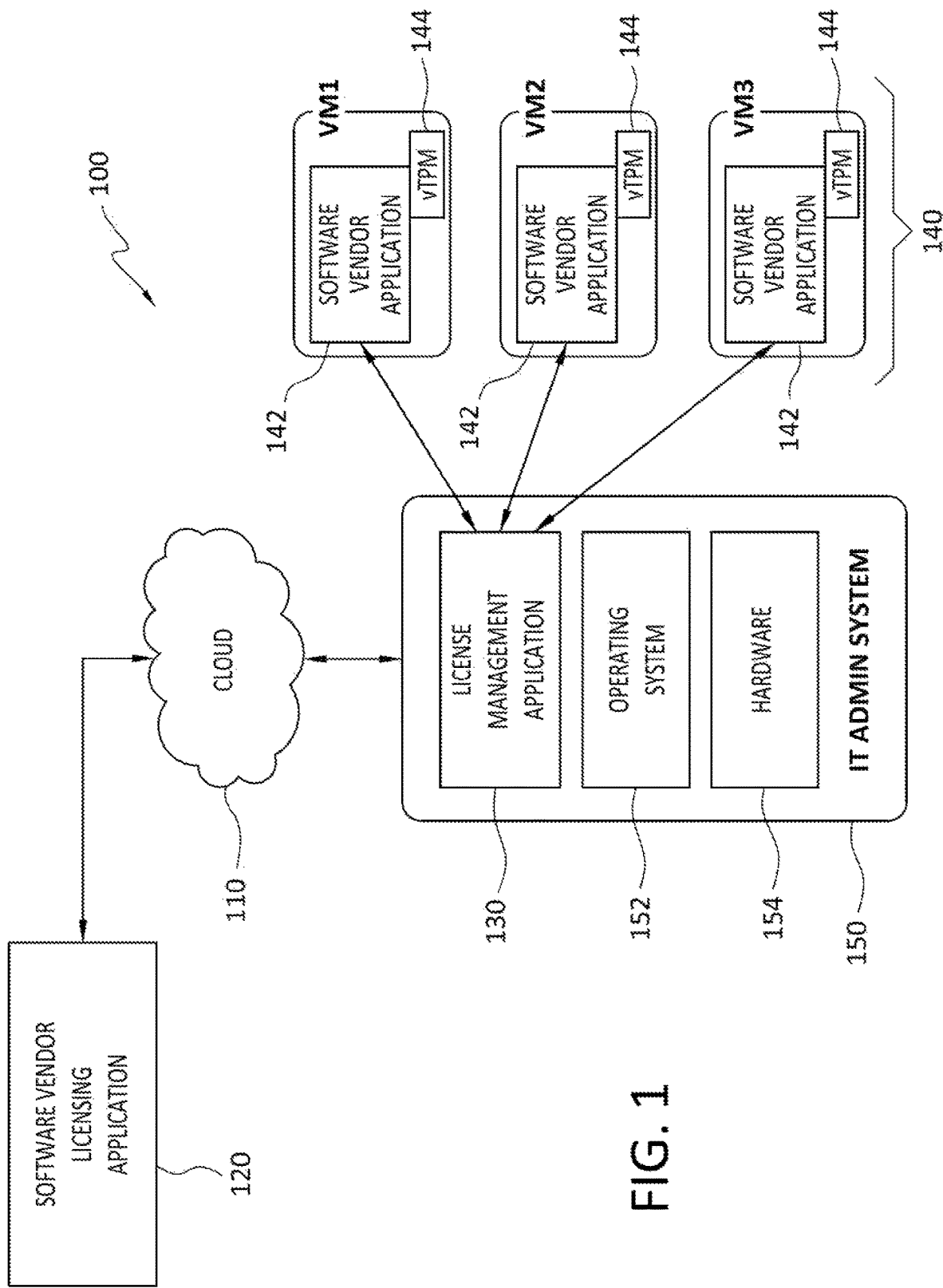
FIG. 1 discloses aspects of an example architecture.

Embodiments of the present invention generally relate to management of software in a virtual environment. More particularly, at least some embodiments of the invention relate to systems, hardware, software, computer-readable media, and methods for preventing software piracy in virtual machines by verifying data encrypted by a virtual Trusted Platform Module (vTPM) that is integrated in the VM.

Some example embodiments may involve one or more aspects. A first aspect of one example embodiment may involve user VM validation. For example, before applying a license key, a cloud computing environment, such as the Dell Cloud for example, may issue a request for a VM validation. To validate the VM, a chunk of a client object including the software details and the encrypted UUID is sent to the user VM. A license management application may prompt for the VM UUID and proceeds with re-encryption of the UUID using an integrated TPM chip of the VM As every user VM may have a unique UUID and master key (Integrated TPM Key), the same encrypted UUID may be generated only by the VM from which the request for update was sent. A comparison of the two encrypted UUIDs may then be performed. On successful validation of the UUID, a request is sent for fetching the license key from the Dell cloud while, on a validation failure, the application installation or update process may be aborted.

A second aspect of an example embodiment may involve license key encryption. For example, a software vendor may generate a license key and append it to the client object. This object may be sent back to the cloud computing environment, such as the Dell cloud, and a corresponding user instance is updated. To ensure data security, the license key may be encrypted using an encrypted UUID sent from the user VM as a part of the client object. This is a software based encryption using a key generated through virtual hardware encryption, making it nearly impossible to break.

A third aspect of an example embodiment concerns decryption and application of the license key. Particularly, the license key may be sent to the user VM from the cloud computing environment in an encrypted format. Since the encryption may have been performed using the encrypted UUID, the decryption of the license key again may require an encrypted UUID to be generated by the VM using the vTPM. If this is the same VM where the request for license key was generated, the decryption of the encrypted license key should be successful using the encrypted UUID.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that embodiments may be applicable to a wide range of devices and operating systems. An embodiment may enable users to obtain license keys for all validly purchased software even after an OS (operating system) reinstallation at the user machine. An embodiment of the invention may effectively address the software piracy problem with minimal dependence on the availability of an internet connection. An embodiment of the invention may resolve the node-locked base licensing problem where a Host ID and user system serial number are sent to a vendor for verification by employing only a UUID of the user VM, rather than critical information such as the Host ID and serial number. Finally, an embodiment may enable a user to avoid sharing information with software vendors.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, cloud computing operations. Example cloud computing operations may include, but are not limited to, installation and use of software on VMs and/or other machines, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

Example public cloud computing environments in connection with which embodiments of the invention may be employed include, but are not limited to, Dell Cloud, Microsoft Azure, Amazon AWS, and Google Cloud. More generally however, the scope of the invention is not limited to employment of any particular type or implementation of cloud storage.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example. A VM may run one or more container-based applications and/or other types of applications.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, various components of an example implementation are disclosed in connection with an example operating environment 100. Particularly, a cloud computing platform 110, such as the Dell Cloud for example, may communicate with at software vendor licensing application 120 and a license management application 130. In turn, the license management application 130 may communicate with one or more virtual machines (VM) 140. The VMs 140 may be part of a cloud computing environment, although that is not necessarily required and, in some embodiments, one or more VMs 140 may reside on premises at an enterprise, for example. As well, the license management application 130 may be an element of an IT administrative system 150, although that is not required. The IT administrative system 150 may also comprise an OS 152 and various computing system hardware 154, and the IT administrative system 150 may reside in a cloud computing environment, but that is not required.

In general, and with continued reference to FIG. 1, the software vendor licensing application 120 may generate a license key for each request that comes from a user by way of the cloud computing platform 110. As well, the license management application 130 may manage all the software application licenses, and also detect the applications on the VMs 140.

The cloud computing site 110 may serve as a platform for users to find relevant software, such as may be installed on one or more VMs 140, to suit their particular needs. In general, the cloud computing site 110 may convey requests for software from the user VMs 140 to the software vendors, such as the software vendors that operate the software vendor licensing application 120, and the cloud computing site 110 may assist legitimate users in claiming and/or reclaiming a software license key, in a secure manner. As well, the cloud computing site 110 may maintain client objects in a secure manner to assist users in situations, such as hardware failure or system migration for example, where a user may lose, or lose access to, the client objects.

With more particular reference now to the example VMs 140, one or more of the VMs 140 may have one or more software vendor applications 142. These software vendor applications 142 may include one or more software vendor applications 142 requested by a user to be installed, or updated. One of more of the VMs 140 may also comprise a virtual Trusted Platform Module (vTPM) 144, examples of which are disclosed elsewhere herein. In general, a vTPM 144 may comprise an integrated controller of the VM 140 that is configured to perform, among other things, encryption at a virtual level.

B. Aspects of Some Example Embodiments

In at least some example embodiments, approaches to management of application licensing may comprise two portions. The first portion may comprise fetching a license key, and the second portion may comprise applying the license key.

Figure 2:
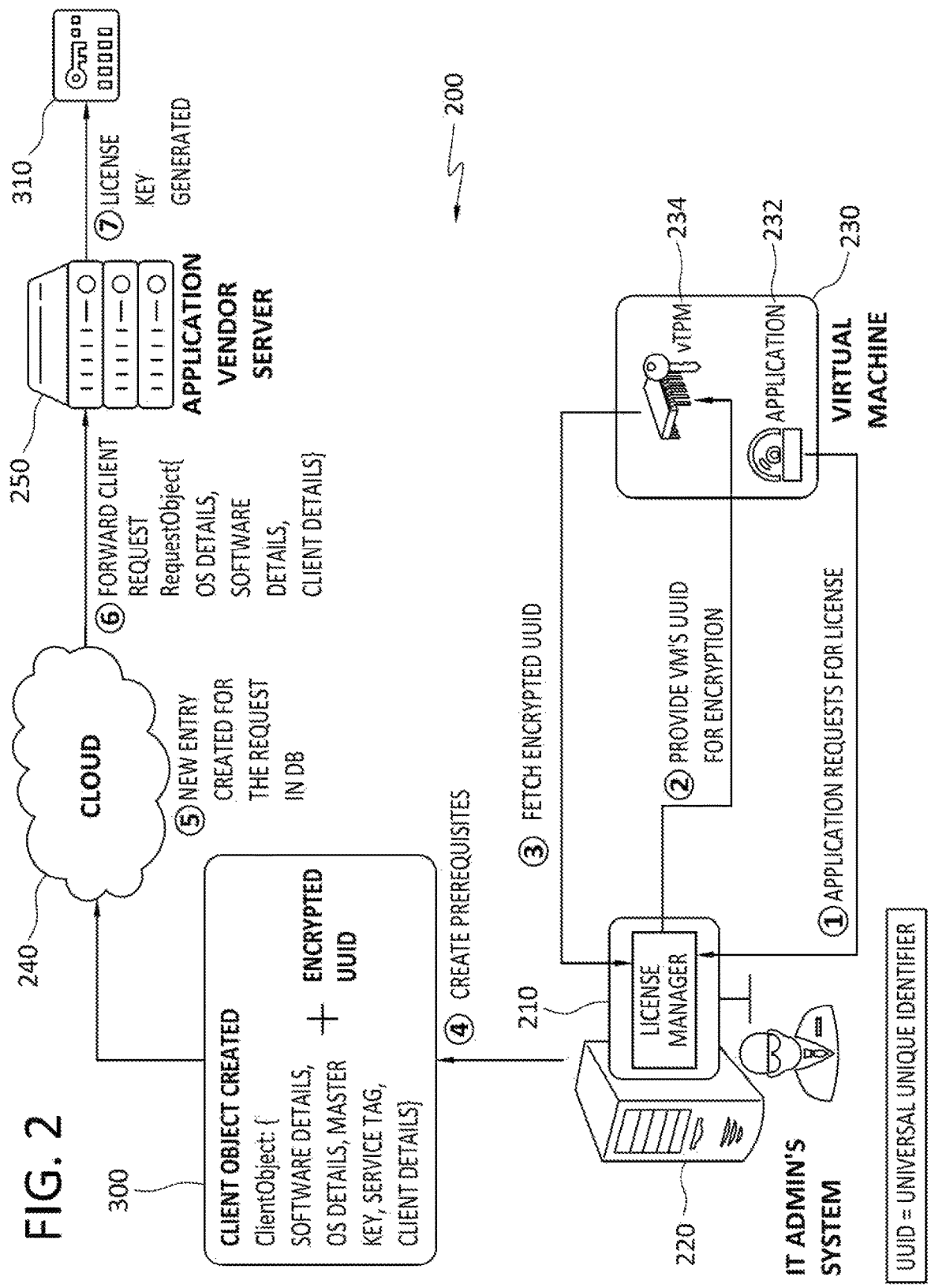
FIG. 2 discloses aspects of an example architecture and method for fetching a license key.

With attention now to FIG. 2, details are provided concerning a configuration and processes for fetching a license key. In general, retrieval of a license key from a software vendor may be based on respective requests generated by user applications, such as user applications on a VM for example. In the configuration 200 of FIG. 2, a license manager 210, which may be part of an IT administrative system 220, is configured to communicate with one or more VMs 230, and with a cloud computing site 240, such as the Dell Cloud for example. The cloud computing environment, in turn, may communicate with an application vendor server 250.

As shown in FIG. 2, the process for fetching a license key may begin at (1) when the user application 232, on the VM 230, that needs the license key sends a request to the license manager 210, or license management application, installed on the IT administrative system 220. The user application 232, while it may already be installed on the VM 230, may still need to be validated with the vendor, and thus requests (1) the license key. As discussed below, the license key request from the VM 230 is ultimately forwarded by the license manager 210 to the cloud computing site 240.

Before forwarding the license key request to the cloud computing site 240, the license manager 210 may send the VM 230 Universal Unique Identifier (UUID) (2) to the vTPM 234 on the VM 230 for encryption. The vTPM 234 may then perform encryption of the UUID using a master key, which may be a randomly generated stream of bits unique to the vTPM 234. The encrypted UUID may then be returned (3) by the VM 230 to the license manager 210. It is noted that in some embodiments, no entity except the VM 230 has access to, or knowledge of, the master key. By way of illustration, the license manager 210 does not have access to, or knowledge of, the VM 230 master key. Each VM may have a unique vTPM that is not used or shared by any other VM. In this way, assurance may be had that, for a particular encrypted UUID, there is only one VM that could have created that encrypted UUID.

The license manager 210 may then create and send (4) a client object 300—that is specific to the VM 230. The client object 300 may contain, for example, information pertaining to the OS and/or other attributes of the VM 230, the application 232 seeking the license, the encrypted UUID, and/or any other attributes that establish the application 232 as legitimate and that the software vendor 250 requires to generate the license key.

This client object 300 may form the basic unit of user data stored on the cloud computing site 240. The cloud computing site 240, using the client object 300, may then create (5) an instance for the license request (1) sent by the application 232 on the VM 230. More generally, the cloud computing site 240 may create an instance for every license request (1) sent by the VM 230, and may also forward (6) a subset of the client object 300 to the software vendor 250 requesting generation of the requested license key. The various instances may be stored in a database at the cloud computing site 240 and/or elsewhere. Finally, the software vendor 250 may validate the client object 300, and may append the client object 300 with a license key 310 newly generated (7) by the software vendor 250 as a result of successful validation of the client object 300.

Validation of the client object 300 by the software vendor 250 may be performed in various ways. In general however, validation, if successful, may serve as a way to bind the license key 310 to the VM 230. The validation process may comprise comparing information in the client object 300 with archived information to determine whether or not the application 232 comprises pirated software. The information to which the client object 300 is compared may be archived at the cloud computing site 240 and/or elsewhere.

Figure 3:
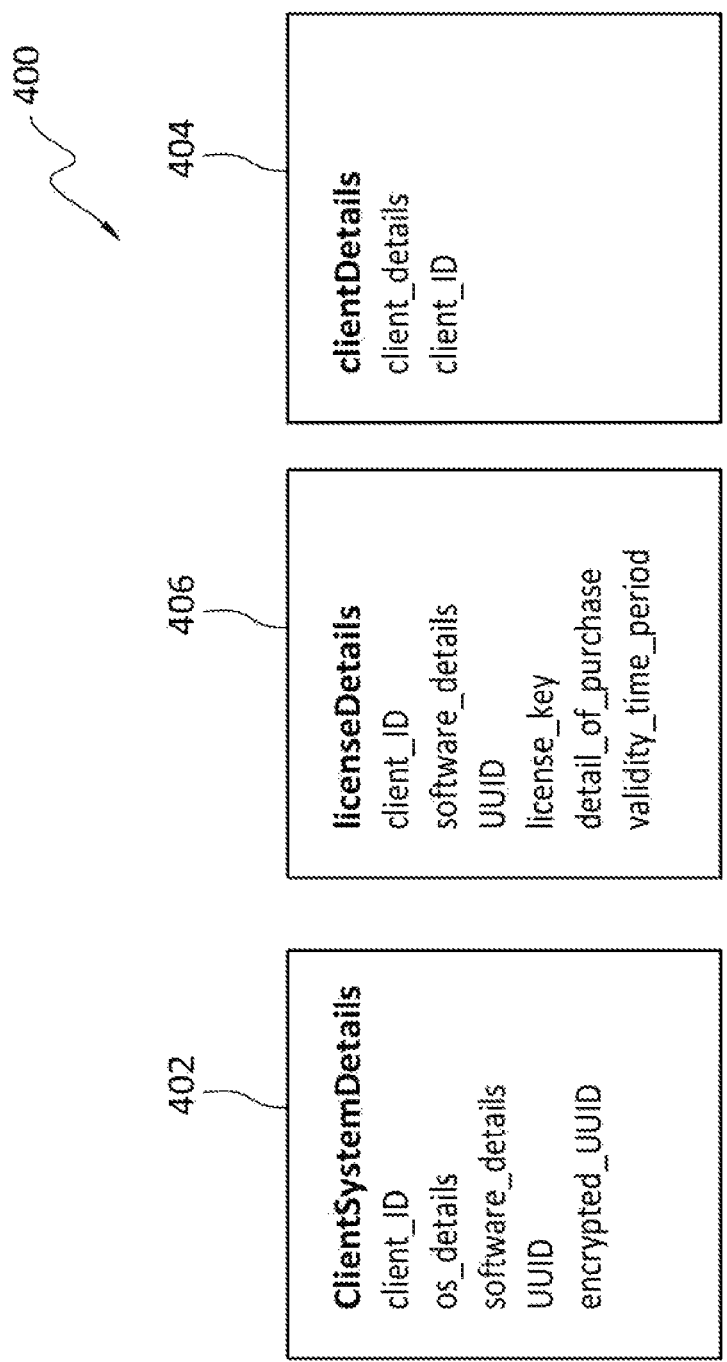
FIG. 3 discloses aspects of an example database structure.

With reference next to FIG. 3, and continuing reference to FIG. 2, a database structure 400 is disclosed. In general, the database structure 400 may be implemented at the cloud computing site 240 and/or elsewhere. The database structure 400 may comprise the archived information to which the cloud computing site 240 compares the client object 300 in a validation process. Particularly, the information used for the validation process may comprise, for example, any of the ClientSystemDetails 402 and/or any of the ClientDetails 404. In some particular embodiments, validation may comprise comparing the encrypted UUID of the ClientSystemDetails 402 with the encrypted UUID contained in the client object 300. If the two encrypted UUIDs match, then the VM 230/application 232 is validated as legitimate and a license key 310 may be issued. If the encrypted UUIDs do not match, the software vendor 250 may send a notification to the cloud computing site 240 and/or to the license manager 210 indicating that validation was unsuccessful.

As well, and also indicated in FIG. 3, the database structure 400 may also comprise information concerning a license associated with the VM 230 and/or application 232. Particularly, such information may comprise any of the LicenseDetails 406. As shown in FIG. 3, the 'licensekey' issued to the VM 230/application 232 by the software vendor 250 may be stored as part of the LicenseDetails 406.

Figure 4:
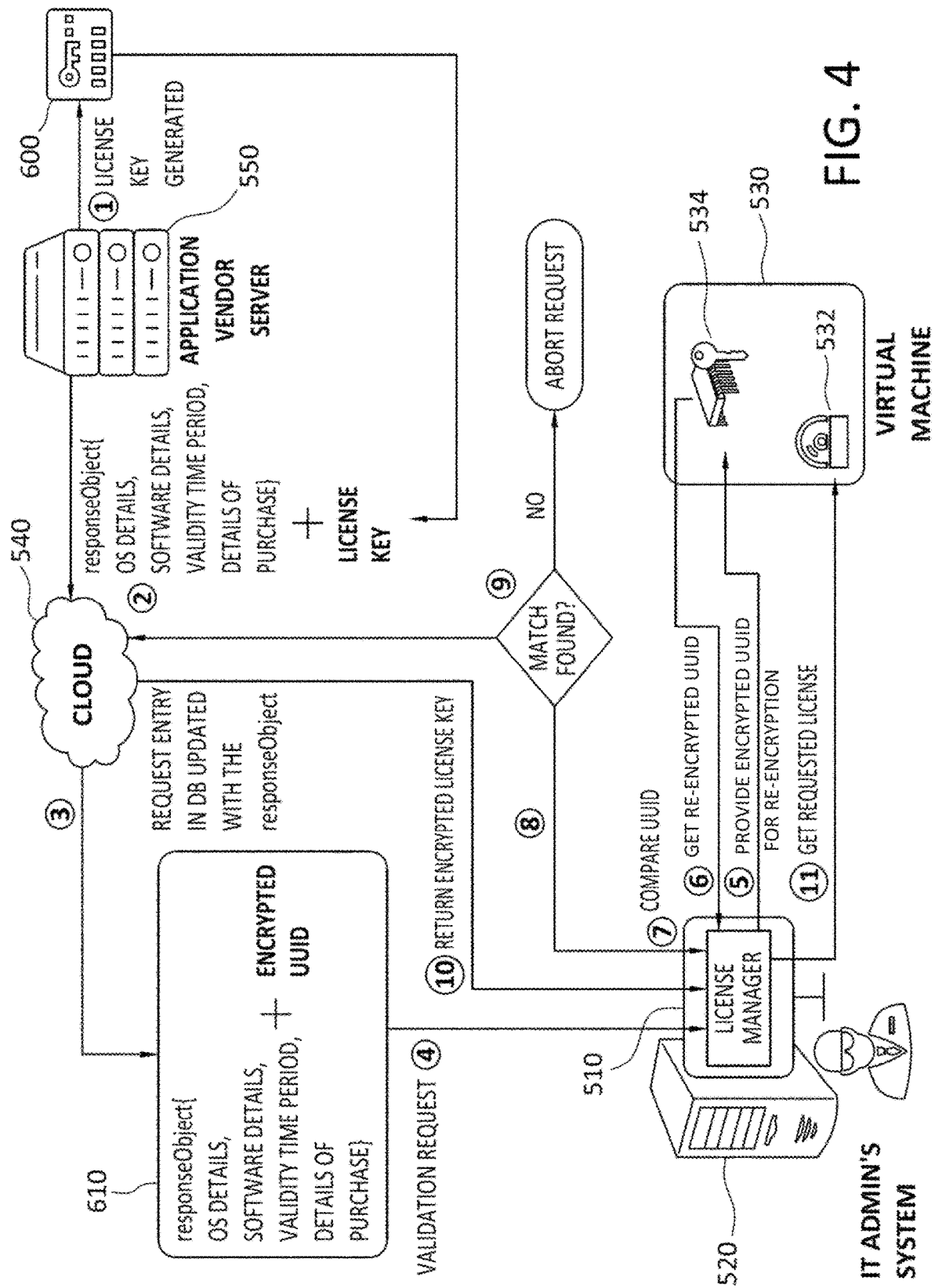
FIG. 4 discloses aspects of an example architecture and method for applying a license key.

With attention now to FIG. 4, an architecture is disclosed that may be similar, or identical, to the architecture disclosed in FIG. 2, although that is not required. In the architecture of FIG. 4, a license key may be applied. Thus, FIG. 4 discloses an arrangement that includes a license manager 510, on an IT administrative system 520, that may communicate with a VM 530. The VM 530 may comprise an application 532 and vTPM 534. As well, the license manager 510 may communicate with a cloud computing site 540 which, in turn, may communicate with a software vendor 550.

As shown in FIG. 4 (and FIG. 3 at (7)), the software vendor 550 may generate (1) a license key 600 and appends the license key 600 to a client object 610. The client object 610, which may be referred to as a 'ResponseObject,' may then be sent (2) to the cloud computing site 540, which may update (3) the corresponding user instance. Particularly, the cloud computing site 540 may request that an entry, which may be a client-specific entry that corresponds to the VM 530 and/or application 532, in a database structure be updated to include the object 610.

Before applying the license key 600, the cloud computing site 540 may request (4) VM 530 validation by the license manager 510 to validate the VM 530. In response to the validation request (4), a chunk of the client object 610 including the software details and the encrypted UUID may be sent (5) by the license manager 510 to the VM 530. As part of (5), or otherwise, the license manager 510 may prompt the VM 530 for the VM 530 UUID. In response to the prompt, the VM 530 may proceed with re-encryption of the UUID using the integrated vTPM 534, and then return (6) the re-encrypted UUID to the license manager 510. Because every VM 530 may have a unique UUID and master key (that is, integrated TPM key), the same encrypted UUID will be generated only by the VM from which the request for software application installation/update was sent.

The cloud computing site 540 may then compare (7) the encrypted UUID received (6) from the VM 530 with the encrypted UUID stored in the archive. If the encrypted UUIDs match, the cloud computing site 540 may notify (8) the license manager 510 and return (10) the encrypted license key to the software manager 510. If the encrypted UUIDs do not match, the cloud computing site 540 and/or other entity may abort (9) the request.

As noted, when validation is successful, the encrypted license key may be sent (1) by the cloud computing site 540. Particularly, because the encryption of the license key may be performed by the cloud computing site 540 using the encrypted UUID, the decryption of the license key likewise requires an encrypted UUID to be generated by the VM 530 using the vTPM. If this is the same VM 530 where the request for license key was generated (see, for example, (1) in FIG. 2), the decryption of the encrypted license key at the VM 530 should be successful with the encrypted UUID.

Note that to ensure data security, the license key may be encrypted (10) using the encrypted UUID sent (6) from the VM 530 as a part of the client object 610. This may be a software based encryption using a key generated through virtual hardware encryption, which may make the encryption nearly, or at least practically, impossible to break, except by the TPM 534 of the VM 530.

Finally, after the license manager 510 has received (10) the encrypted license key, the encrypted license key may be transmitted (11) by the license manager 510 to the VM 530. The VM 530 may decrypt the encrypted license key, using the encrypted UUID, and then run the application 532.

C. Further Discussion

Advantageously, embodiments of the invention may be employed even in circumstances where a VM is reimaged, and/or when an application needs to be reinstalled on a VM. Particularly, the UUID and TPM, or vTPM, of the VM may not undergo any modifications when a VM is reimaged. Hence, the user still may have the option to retrieve license keys for all the installed software by connecting to the cloud computing site. Upon successful validation of the UUID, the license manage may automatically notify the user about the applications for which valid license keys are already available at the cloud computing site. In this way, the user may be able to install all applications that were present on the VM before the VM was reimaged.

Another aspect of some embodiments concerns the Trusted Platform Module. As noted earlier, solutions have been proposed to prevent software piracy, but have not proven to be particularly effective. In contrast, embodiments of the invention may operate to bind the license keys to the TPM itself, so that only the VM/TPM from which the license key was requested would be able to use the key. As used herein, TPM (Trusted Platform Module) may be implemented as a cryptographic coprocessor that includes capabilities for random number generation and secure generation of cryptographic keys. Thus, VMs that comprise a TPM may create cryptographic keys and encrypt those keys so that they can only be decrypted by the TPM. This process, which may be referred to as wrapping or binding a key, may help protect the key from disclosure. Further, as TPMs may already be integrated into some VMs, those TPMs may be used for encryption purposes and may avoid any additional expense that would be associated with modification of a VM to include a TPM.

As will be apparent from this disclosure, embodiments of the invention may provide various useful features and benefits, although none of these are required to be provided by any embodiment. To illustrate, embodiments may be applicable to a wide range of devices ranging from desktops to laptops to servers and may be made available to a wide range of operating systems, thus eradicating the problems faced by standard piracy protection methodologies such as DRM (Digital Rights Management). As another example, embodiments may also enable a user to readily obtain license keys for all the purchased software even after a reinstallation of an OS of a VM.

As well, the methodology employed in some embodiments may be a relatively simple, secure, and a fast way to address piracy with a minimal dependency on internet connection availability. This may make such embodiments well suited for software piracy protection and also evades the complexities involved in block chain, DRM or other approaches.

Finally, embodiments of the invention may employ only the UUID of the user VM, rather than a Host ID and serial number. The UUID may be preferable as it does not convey any user-specific information, as a Host ID and serial number of a VM would. It is also noted that the user need not share any information with the software vendors, since the license key application process may be picked up by the cloud computing site after the license key has been generated by the software vendor.

D. Further Example Embodiments

Following are some further example embodiments of the invention. These are presented only by way of example and are not intended to limit the scope of the invention in any way.

Embodiment 1. A method, comprising: receiving, from a VM, a request for a software license; in response to the request, transmitting a UUID to the VM; receiving, from the VM, a response that comprises a first encrypted UUID corresponding to the request; and transmitting a client object that includes the first encrypted UUID, and the client object serves as a request for entry of the client object in a database of a cloud computing site.

Embodiment 2. The method as recited in embodiment 1, wherein the software license is for software that has been installed on the VM.

Embodiment 3. The method as recited in any of embodiments 1-2, wherein the client object further comprises information about the VM.

Embodiment 4. The method as recited in any of embodiments 1-3, further comprising receiving, from a cloud computing site, a validation request that includes a response object with a second encrypted UUID.

Embodiment 5. The method as recited in embodiment 4, wherein the operations further comprise, obtaining, in response to the validation request, a second encrypted UUID from the VM.

Embodiment 6. The method as recited in embodiment 5, wherein the operations further comprise receiving, from the cloud computing site, an encrypted license key only when the first encrypted UUID matches the second encrypted UUID.

Embodiment 7. The method as recited in embodiment 6, further comprising transmitting, to the VM, the encrypted license key.

Embodiment 8. A method, comprising: transmitting, by a VM, a request for a software license; receiving a UUID in response to the request; encrypting the UUID to create a first encrypted UUID, wherein the encrypted UUID is specific to the VM; transmitting the first encrypted UUID; receiving an encrypted license key; and decrypting the encrypted license key.

Embodiment 9. The method as recited in embodiment 8, wherein the encrypted UUID is created with a vTPM chip of the VM.

Embodiment 10. The method as recited in any of embodiments 8-9, further comprising receiving the UUID a second time, and encrypting the UUID received the second time to create a second encrypted UUID.

Embodiment 11. The method as recited in embodiment 10, wherein the encrypted license key is received only when a determination has been made that the first encrypted UUID matches the second encrypted UUID.

Embodiment 12. The method as recited in any of embodiments 8-11, wherein the operations further comprise running, at the VM, software that corresponds to the requested software license and encrypted license key.

Embodiment 13. The method as recited in any of embodiments 8-12, wherein: the request for the software license is transmitted to a license manager; the UUID is received from the license manager; the first encrypted UUID is transmitted to the license manager; and the encrypted license key is received from the license manager.

Embodiment 14. The method as recited in any of embodiments 8-13, wherein the encrypted license key is decrypted with a vTPM chip of the VM.

Embodiment 15. The method as recited in any of embodiments 8-14, wherein the encrypted license key is obtained by the VM without the use of a Host ID or serial number.

Embodiment 16. The method as recited in embodiment 8, wherein the encrypted license key is obtained as a result of an operating system reinstallation at the VM.

Embodiment 17. A method having stored therein instructions that are executable by one or more hardware processors to perform operations comprising: receiving a client object that includes an encrypted UUID; creating a new database entry corresponding to the client object; forwarding a request object to a software vendor requesting generation of a license key, and the request object is based on the client object; receiving, from the software vendor, a response object that includes the requested license key; creating a new database entry corresponding to the response object; and transmitting a validation request that includes the response object.

Embodiment 18. The method as recited in embodiment 17, further comprising validating a VM that requested the license key.

Embodiment 19. The method as recited in embodiment 18, further comprising returning an encrypted license key after the VM has been validated.

Embodiment 20. The method as recited in embodiment 18, further comprising transmitting an abort request when validation of the VM has failed.

Embodiment 21. A method for performing any of the operations, methods, or processes, or any portion of any of these, disclosed herein.

Embodiment 22. A non-transitory storage medium having stored therein instructions that are executable by one or more hardware processors to perform the operations of any one or more of embodiments 1 through 21.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
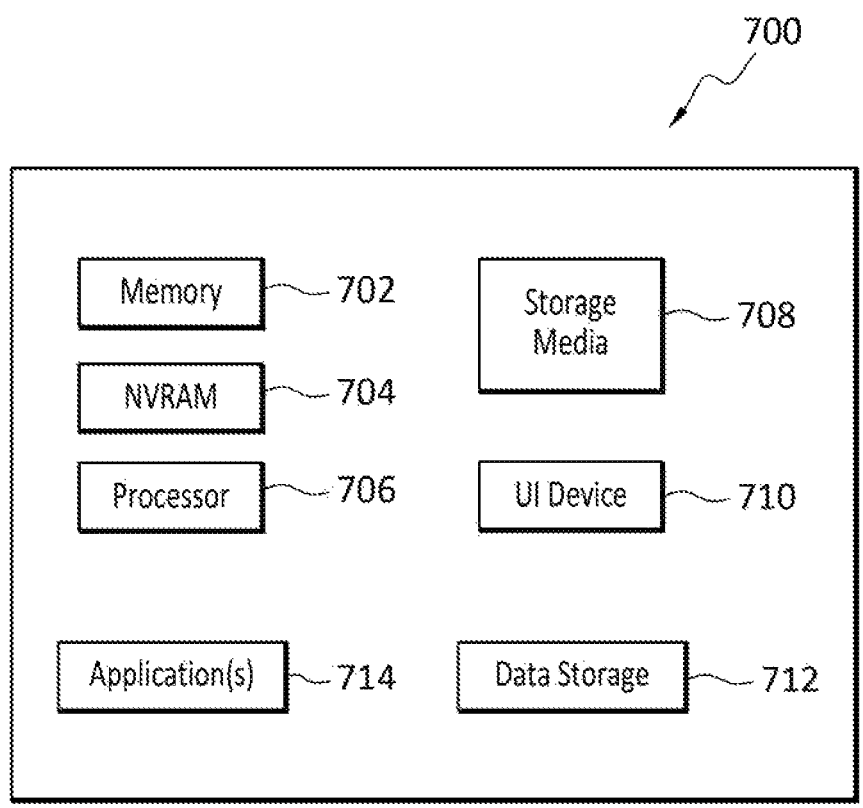
FIG. 5 discloses aspects of an example computing entity.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 5.

In the example of FIG. 5, the physical computing device 700 includes a memory 702 which may include one, some, or all, of random access memory (RAM), non-volatile random access memory (NVRAM) 704, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions that are executable by one or more hardware processors to perform operations comprising:
   transmitting, by a virtual machine (VM), a request for a software license;
   receiving, by the VM, a universal unique identifier (UUID) in response to the request;
   encrypting, by the VM using a master key, the UUID to create an encrypted UUID, wherein the encrypted UUID is specific to the VM and only the VM has access to, and knowledge of, the master key;
   transmitting, by the VM, the encrypted UUID to a license manager;
   receiving by the VM, in connection with a validation request issued by a cloud computing site to the license manager, the encrypted UUID and the VM re-encrypting the encrypted UUID to create a re-encrypted UUID;
   receiving an encrypted license key when the re-encrypted UUID matches the encrypted UUID; and
   decrypting the encrypted license key.

2. The non-transitory storage medium as recited in claim 1, wherein the encrypted UUID is created with a unique virtual Trusted Platform Module (vTPM) chip of the VM, and the unique vTPM is not used or shared by any other VM.

3. The non-transitory storage medium as recited in claim 1, wherein the encrypted license key is received only when a determination has been made that the encrypted UUID matches the re-encrypted UUID.

4. The non-transitory storage medium as recited in claim 1, wherein the operations further comprise running, at the VM, software that corresponds to the requested software license and encrypted license key.

5. The non-transitory storage medium as recited in claim 1, wherein the encrypted license key is decrypted with a virtual Trusted Platform Module (vTPM) chip of the VM.

6. The non-transitory storage medium as recited in claim 1, wherein the encrypted license key is obtained by the VM without the use of a Host identifier (ID) or serial number.

7. The non-transitory storage medium as recited in claim 1, wherein the encrypted license key is obtained as a result of an operating system reinstallation at the VM.

* * * * *